M. F. SAUER.
Collar-Pad.

No. 198,048.　　　　　　Patented Dec. 11, 1877

WITNESSES:
Francis McArdle.
J. H. Scarborough.

INVENTOR:
M. F. Sauer.
BY Munn & Co.
ATTORNEYS.

UNITED STATES PATENT OFFICE.

MARTIN F. SAUER, OF SOMONAUK, ILLINOIS.

IMPROVEMENT IN COLLAR-PADS.

Specification forming part of Letters Patent No. 198,048, dated December 11, 1877; application filed October 19, 1877.

*To all whom it may concern:*

Figure 1:
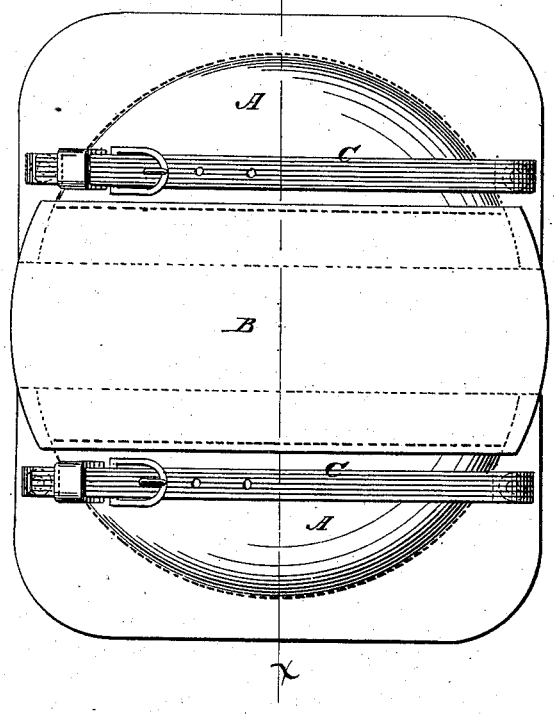
Figure 2:
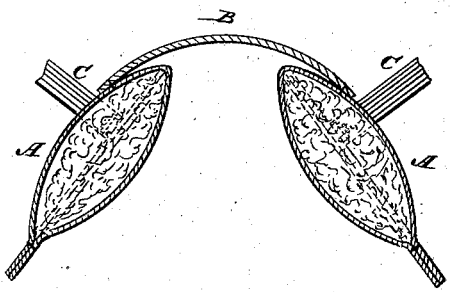

Be it known that I, MARTIN FRIEDRICH SAUER, of Somonauk, in the county of De Kalb and State of Illinois, have invented a new and useful Improvement in Collar-Pad for Horses, of which the following is a specification:

Figure 1 is a top view of my improved pad. Fig. 2 is a cross-section of the same taken through the line $x\,x$, Fig. 1.

Similar letters of reference indicate corresponding parts.

The object of this invention is to furnish an improved pad to prevent the top of the necks of horses and mules from being made sore by the collar, and to enable them to heal, when sore, while the animal is kept at work, and which shall be simple in construction and convenient and effective in use.

The invention will first be described in connection with the drawing, and then pointed out in claim.

A A are two elliptical pads connected by a strap, B, and provided with loops C C. The pads A A fit on the upper part of the horse's neck, while the strap B rises slightly above the neck, leaving the crown or upper portion of the neck unpressed and out of contact with pads or straps. The collar passes around the outer sides of pads and through the loops C C.

I am aware that it is not new, broadly, to use a tree with pads applied thereto in such manner as to leave a clear space between the same and the neck of the animal; but

What I claim as new, and of my invention, is—

The two pads A A, connected by flexible strap B, and made independent of and applicable to any collar, as shown and described.

MARTIN FRIEDRICH SAUER.

Witnesses:
THEODORE BOOS,
NIKOLAS DIETERICH.